Jan. 31, 1967 L. J. DONOHOE ETAL 3,302,180

DIGITAL DATA HANDLING

Filed April 9, 1963 5 Sheets-Sheet 1

Leonard J. Donohoe
Arthur D. Fritz
David E. Keefer
NICK G. NICOLAU
INVENTORS

BY Melvin Sharp
ATTORNEY

Jan. 31, 1967 L. J. DONOHOE ETAL 3,302,180

DIGITAL DATA HANDLING

Filed April 9, 1963 5 Sheets-Sheet 2

Leonard J. Donohoe
Arthur D. Fritz
David E. Keefer
NICK G. NICOLAU
INVENTORS

BY [signature]
ATTORNEY

Leonard J. Donohoe
Arthur D. Fritz
David E. Keefer
NICK G. NICOLAU
INVENTORS

BY [signature]
ATTORNEY

• = AND
⊕ = EXCLUSIVE OR
$\overline{XA4}$ = COMPLIMENT OF XA4 OUTPUT

Leonard J. Donohoe
Arthur D. Fritz
David E. Keefer
NICK G. NICOLAU
INVENTORS

BY [signature]
ATTORNEY

DIGITAL DATA HANDLING

Filed April 9, 1963 5 Sheets-Sheet 5

Leonard J. Donohoe,
Arthur D. Fritz,
David E. Keefer,
NICK G. NICOLAU
INVENTORS

BY Melvin Sharp
ATTORNEY

United States Patent Office 3,302,180

Patented Jan. 31, 1967

3,302,180

DIGITAL DATA HANDLING

Leonard J. Donohoe and Arthur D. Fritz, Houston, Tex., and David E. Keefer and Nick G. Nicolau, Scottsdale, Ariz., assignors to Texas Instruments Incorporated, Dallas, Tex., a corporation of Delaware Filed Apr. 9, 1963, Ser. No. 271,679
21 Claims. (Cl. 340—172.5)

The invention relates to digital computers and more particularly to the transfer of digital data from a tape storage means to a buffer memory.

An object of the invention is the efficient handling and processing of large amounts of sequential digital data stored on magnetic tape.

Another object of the invention is to effect the transfer of digital data from a storage means having large amounts of data therein into a buffer memory of minimum storage capacity and still provide a sufficient supply of data in the buffer memory for high speed computer operations.

Still another object of the invention is the efficient handling of digital words arranged in continuous blocks on magnetic tape wherein, in the transfer of words from the magnetic tape to a buffer memory, no words are lost.

One feature of the invention is a novel method of and apparatus for regulating the flow of digital data read-in to the buffer memory in response to the amount of data stored in the buffer memory.

Another feature of the invention is a novel method of and apparatus for sequentially transferring each digital word in parallel into a buffer memory asynchronously with respect to the computer access to each word after it is read-in to the buffer memory.

Still another feature of the invention is a novel method of and apparatus for correlating the start-stop-reverse operation of a reel magnetic tape in conjunction with the transfer of data from the tape into a buffer memory and further in conjunction with the amount of data stored in the buffer memory.

The foregoing and other objects, features and advantages of the invention will be apparent from the following detailed description taken in connection with the appended claims and attached drawings in which:

Figure 2:
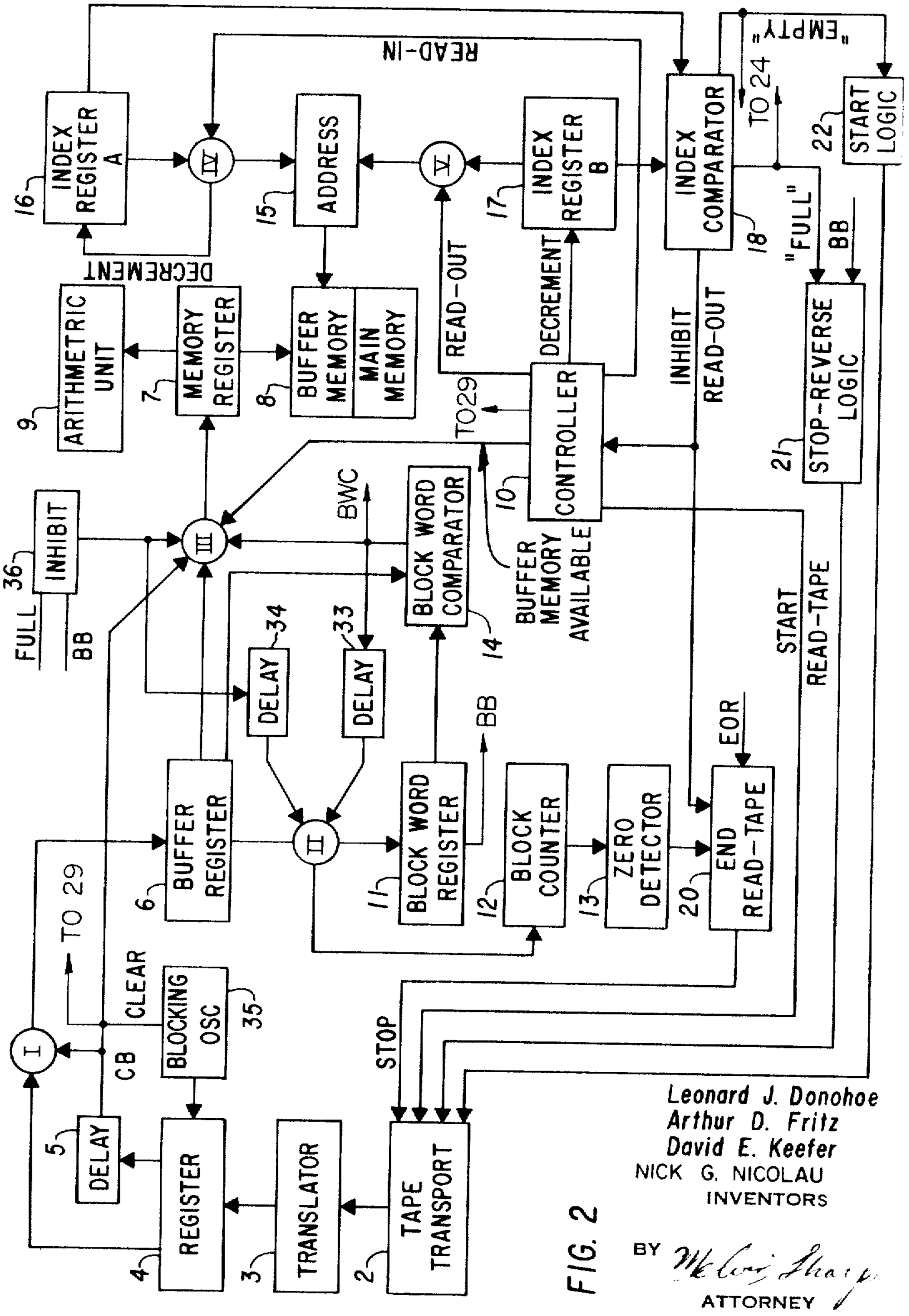
FIGURE 2 is a functional block diagram of a system embodiment of the invention.
Figure 4A:
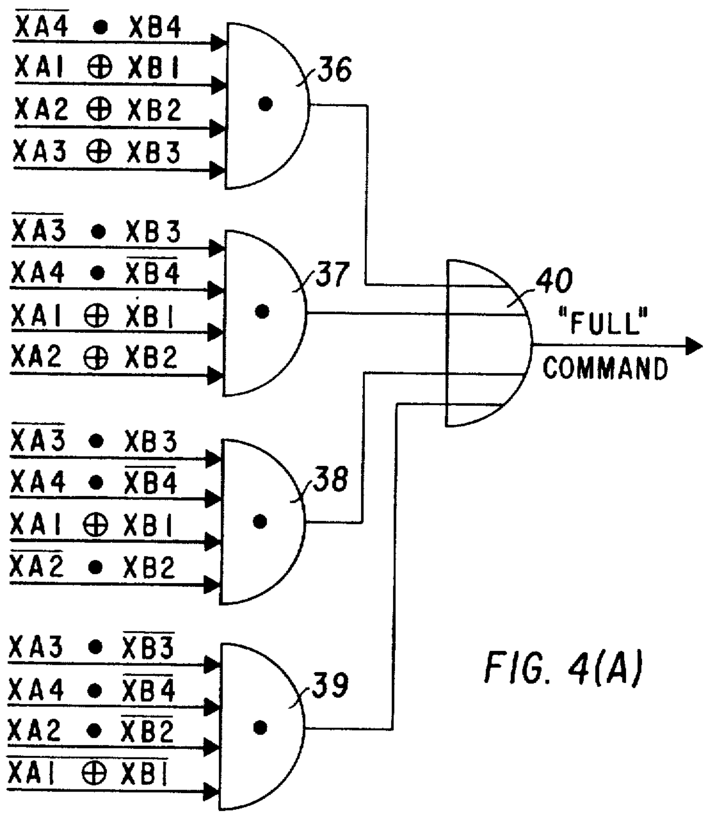
Figure 4B:
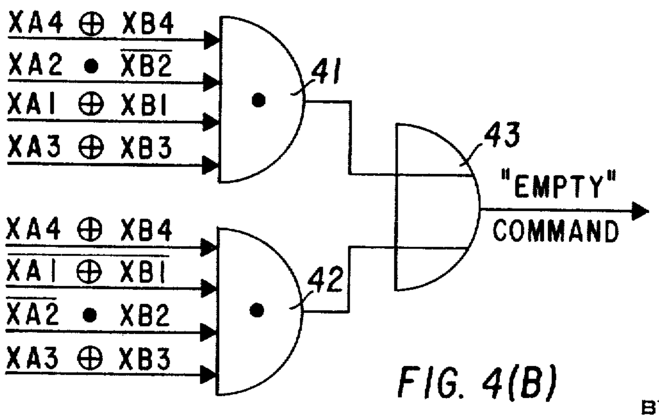

FIGURES 4*a* and 4*b* are logic diagrams of the index comparator illustrated in FIGURE 2.

Figure 5A:
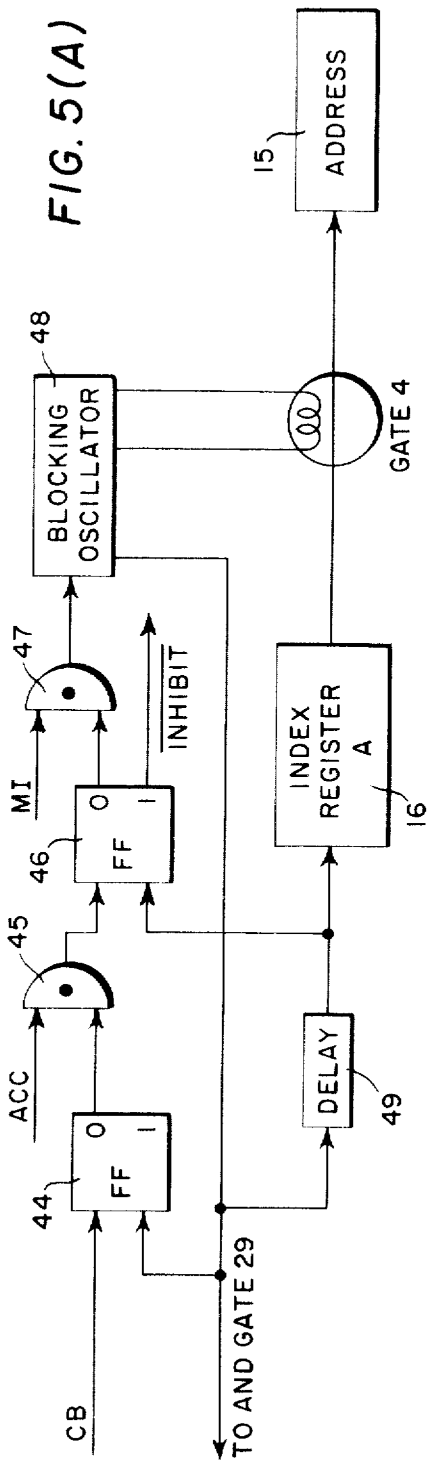
Figure 5B:
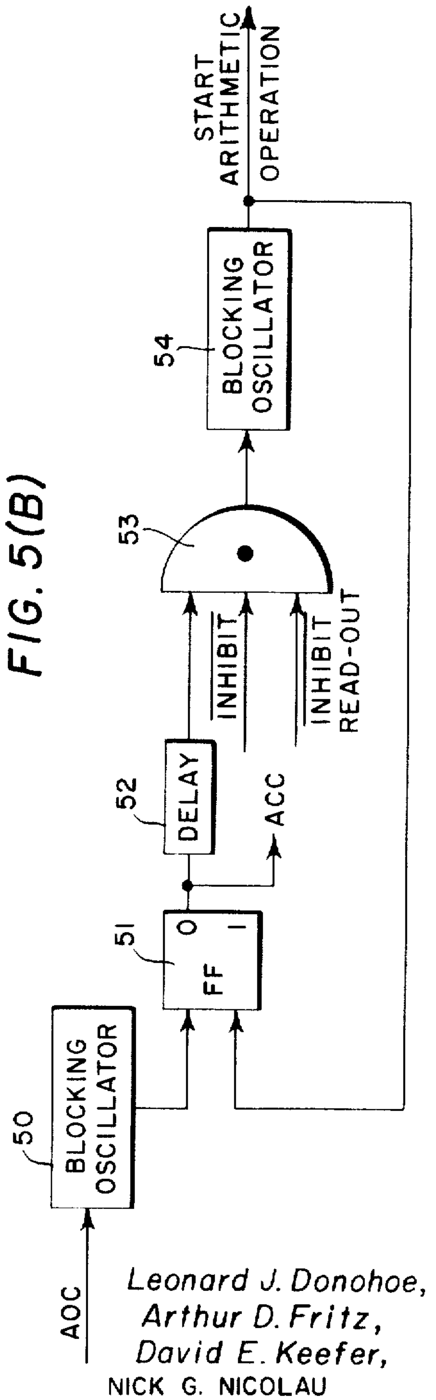

FIGURES 5*a* and 5*b* are logic diagrams of the controller illustrated in FIGURE 2.

The invention, in a preferred embodiment, relates generally to an asynchronous digital computer wherein digital words are sequentially read-in to a buffer memory in parallel and wherein the arithmetic unit has access to each word after it is read-in to the buffer memory. More specifically, the invention relates to the regulation of the transfer of words from a reel magnetic tape to said buffer memory in response to the amount of words stored in the buffer memory in conjunction with the operation of the reel tape.

The system, according to the invention, has two sequential modes of operation and a recycle operation for preparing the system for the next two sequential modes of operation.

The first mode of operation is the search mode and the second is the read mode. In the search mode, the system hunts for the desired block of words to be transferred into the memory. Upon finding the desired block, the search mode terminates and the read mode begins. In the read mode, words are read-in to the buffer memory sequentially.

During the read mode, the arithmetic unit in the computer has access to each word after it has been read-in to the buffer memory, in consequence of which, the buffer memory may or may not become full depending on the computer program. Therefore, the system monitors the amount of words stored in the buffer memory and if the amount reaches a predetermined maximum, the system gives a "full" command which, in conjunction with another command indicating that a complete block of words has been read-in to the buffer memory, terminates the read mode.

At the termination of the read mode, the system recycles itself and prepares for the next search mode.

Since the read mode has terminated, no more words are read-in to the buffer memory. However, the computer continues its arithmetic operation and words are read-out of the buffer memory until the amount of words stored in the buffer memory reaches a predetermined minimum. The system, monitoring the mounts of words stored in the buffer memory, responds to said predetermined minimum and gives an "empty" command which initiates the search mode.

Upon initiation of the search mode, the system operates sequentially in the search mode, then in the read mode and recycles itself in preparation for the next search mode. This sequence of operation continues until a predetermined number of blocks of words have been transferred from the reel tape to the buffer memory. The system operation is terminated in response to a command indicating that said predetermined number of blocks have been transferred, in conjunction with another command indicating that the computer has used all the words stored in the buffer memory.

More specifically, and relating to the cooperation of the search mode, the read mode and the recycle operation, the reel tape is given a stop command at the termination of the read mode. Since the reel tape does not actually stop in response to said command but "overshoots" due to its momentum and inertia, the recycle operation functions to account for this overshoot. Therefore, in the recycle operation, the reel tape is reversed, after it actually stops, for a distance greater than the overshoot length. The overshoot length, referenced to the position of the read head adjacent the magnetic tape, is the length of tape which moves past the read head after the stop command. At the termination of the recycle operation, the portion of the magnetic tape which was adjacent the read head when the stop command was given is behind the read head since the reel tape was reversed. The reel tape, upon starting, will again move said portion of tape past the read head.

When the search mode is initiated, a start command is given to the reel tape, thereby moving said portion of tape past the read head. Since the system in the search mode hunts for the desired block to begin the read mode and if said portion of tape has a code therein to uniquely indicate the desired block, the read mode will be initiated when said portion of tape is moved adjacent the read head.

In this manner, the read mode is initiated and terminated when said portion of tape is adjacent the read head. A unique code in said portion of tape performs the dual function of indicating when a complete block of words has been read-in to the buffer memory in order to terminate the read mode and also indicates the desired block in order to initiate the read mode.

The system, according to the invention and operating in the above-described manner, is capable of handling digital data from a reel tape having data stored in the overshoot length without losing the data stored therein. Therefore, the maximum storage capacity of reel tape can be utilized since blocks of words can be continuously packed on the tape.

An example of a digital data format on magnetic tape, wherein the maximum storage capabilities of reel tape can be utilized, is a format having successive blocks adjacent one another and wherein the words in each block are adjacent each other. This type of format is particularly suited for storing large amounts of continuous data. For example, large amounts of continuous seismic data such as that obtained in oil exploration may be gathered in the field, arranged in the above-mentioned format on reel tape, and removed to a central processing station for computation and analysis.

Figure 1:
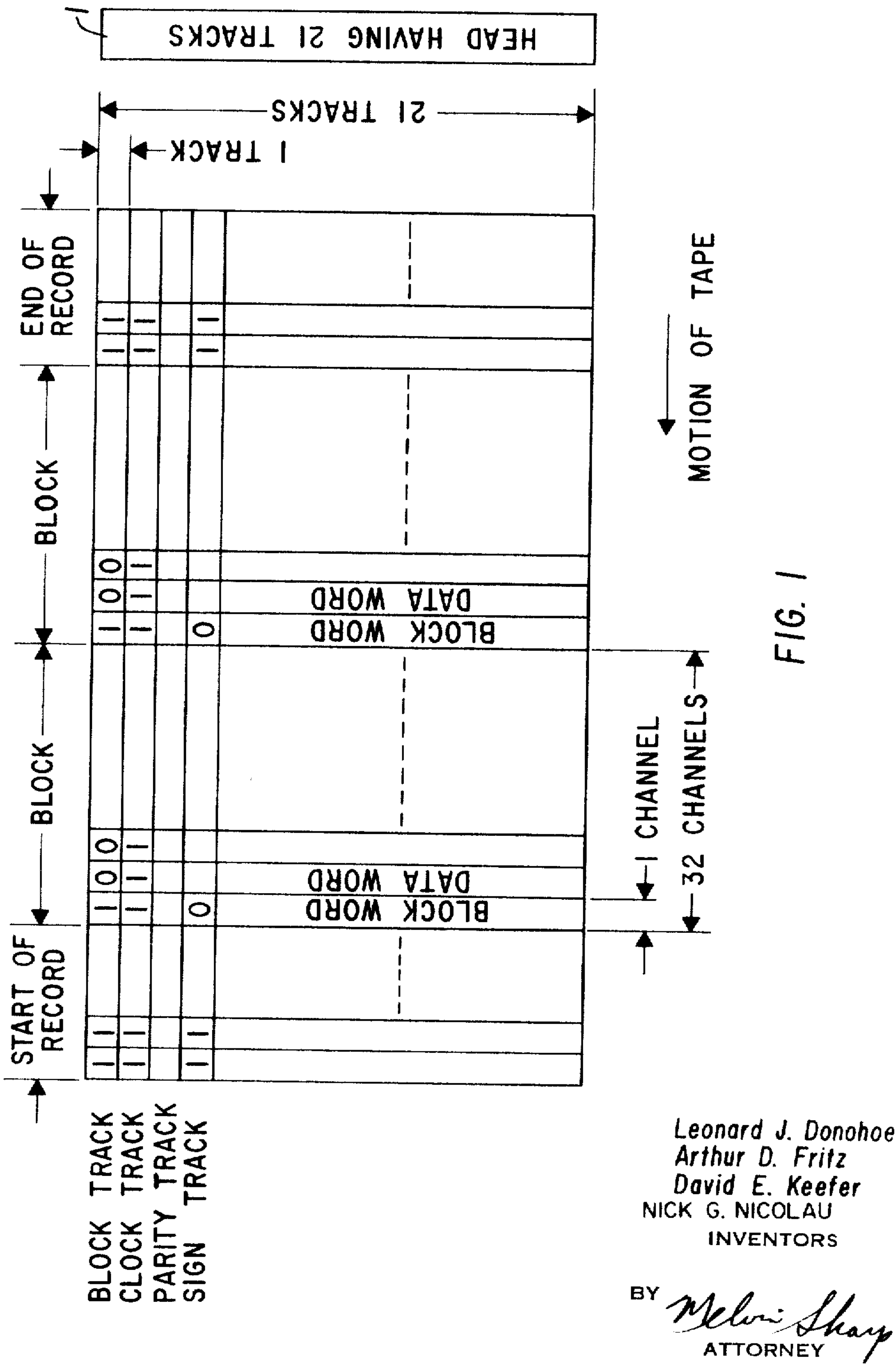
FIGURE 1 illustrates an example of a digital data format on magnetic tape which may be used as the input with the invention.

Referring now to FIGURE 1, wherein there is disclosed a suitable data format for storing large amounts of information on reel magnetic tape, the blocks of words are arranged adjacent one another and the words within a block are adjacent one another. An individual reel tape unit may include as many as fifty records, wherein each record is composed of a start of record code, about 5,000 blocks of words and an end of record code. FIGURE 1 illustrates one such record, including a start of record section, only two blocks of data adjacent one another for simplicity and an end of record section. The record format is arranged in tracks and channels. There are twenty-one tracks and each block includes thirty-two channels. The number of channels in the start of record section and the end of record section is a matter of choice and these sections may be different lengths. Referring now to the block section of the record, the first channel in each block is referred to as the block word which specifies the number of the block and also identifies the channel as a block word. The block word indicates the beginning of a block of words and is used in accordance with the invention to initiate and terminate the read mode. The block word, therefore, is said portion of tape which was mentioned above.

The thirty-one remaining channels in each block are referred to as data words. Each channel includes eighteen data bits and three bits for control purposes, for example, the block bit (BB), clock bit (CB) and the parity bit. Hereinafter, the information in each channel is referred to as a word.

Illustrated in FIGURE 1 as the top three tracks in the record are the block, the clock and the parity tracks. The sign track provides a sign bit for each word and is included as one of the eighteen data bits.

Also, illustrated in FIGURE 1 is the motion of the tape in relation to the head as indicated by the arrow, whereby the words in the start of record section are read-out first, the block word, the data words and then another block word and so on.

The code unique to a block word is a "one" stored in the block bit which distinguishes it from data words which have "zeros" stored in the block track. Therefore, the one in the block track identifies the channel as a block word.

The information is read-out of the tape by parallel read-out, wherein a head 1 having twenty-one tracks therein is positioned across the length of a channel. A one stored in the magnetic tape is indicated by a flux change irrespective of the direction of that change. Therefore, a one is read-out of the magnetic tape by head 1 as a positive or negative pulse depending on the flux change. This merely requires the translation of the positive or negative pulse to a unipolar pulse for indicating the one.

Referring now to FIGURE 2, there is illustrated a functional block diagram of a system embodiment of the invention. The tape transport 2 includes a reel magnetic tape having thereon the data format illustrated in FIGURE 1 and further includes an electro-mechanical reel drive. The tape transport 2 is a system for moving reel magnetic tape past the twenty-one track head 1 and has the capability of stopping and starting within 2 milliseconds from command and also has the capability of moving the tape in reverse. The tape transport, including the electro-mechanical drive for the reel tape, is conventional and a suitable tape transport to be used with the invention is manufactured by Ampex, designated Ampex T-M-2 tape transport.

Prior to initiation of the search mode, the desired block to begin the read mode is set in block word register 11 by pre-setting in said register the block word associated with said desired block. The number of blocks desired to be transferred from tape transport 2 to buffer memory 8 is set in block counter 12. Also, index registers A and B, identified by reference characters 16 and 17 respectively, are pre-set to be equal to each other.

Although the components 11, 12, 16 and 17 are described herein as merely being pre-set, they may be preset either manually or by instruction stored in the main memory, which instruction are transferred to said components on command from controller 10.

To begin the system operation, the proper record is selected, aligned with head 1 and a start-read tape command is given to tape transport 2 by controller 10. In response thereto, the reel tape in tape transport 2 is started.

Upon starting the reel magnetic tape, the system is in the search mode. Each channel of data from the reel magnetic tape is transferred in parallel to the translator 3 after suitable amplification. As mentioned before, the one on the tape is indicated as a positive or negative pulse and it is the function of the translator 3 to convert bipolar pulses to a unipolar pulse. Therefore, at the output of the translator 3, a positive or negative one pulse is represented as a unipolar pulse, for example a negative pulse. There are twenty-one bits of data in each channel on the magnetic tape. Therefore, there are twenty-one outputs fed into the translator 3 from the head 1 adjacent the tape transport 2. The translator 3 transfers the twenty-one bits of data to register 4, wherein twenty-one flip-flops are set in response to the twenty-one bits of data. The contents of register 4 are transferred to buffer register 6 under the control of gate I. The flip-flop in register 4 corresponding to the clock bit is connected to delay 5 whose output is connected to gate I, whereby a one in the clock bit is delayed a predetermined amount by delay 5 and then applied to gate I for triggering said gate. When gate I is triggered, the contents of register 4 are transferred to buffer register 6. However, only twenty bits from the register 4 are transfered to buffer register 6. The clock bit in register 4 is not transferred to buffer register 6 but is only used for triggering gate I in response to a word in register 4.

The purpose of delaying the clock bit by delay 5 is precautionary and necessary to insure that all the bits in a word are stored in register 4 prior to triggering gate I. For example, if the channel is skewed with respect to the head, then the bits in the channel would arrive at different times in register 4. Delay 5 provides a suitable time delay so that all bits in a channel are stored in register 4 prior to transferring to buffer register 6.

When the contents of register 4 are transferred to buffer register 6 under the control of the clock bit triggering gate I, the register 4 is cleared. This is accomplished by the gate I trigger applied to blocking ocsillator 35 which in turn is connected to register 4 for clearing said register. Thus, it can be seen that words are sequentially transferred from tape transport 2 into register 4 and a one in the clock bit of register 4 triggers gate I for transferring each word from register 4 to buffer registe 6 whereupon register 4 is cleared. Words are thereby sequentially transferred into buffer register 6 and each succeeding word applied to buffer register 6 destroys the preceding word stored therein.

Since the system is operating in the search mode, wherein gates II and III are inhibited, words in buffer register 6 are not transferred to memory register 7 until the desired block is found. As recalled, the desired block is stored in block word register 11 since the block word associated with the desired block is pre-set in said register. When said block word is transferred into buffer register 6, the contents of buffer register 6 and block word register 11 are coincident. The function of the block word comparator 14 is to compare the contents of buffer register 6 and block word register 11 to determine when the search mode should terminate. For this comparison it is only necessary that the sixteen least significant bits in buffer register 6 be compared with sixteen bits in block word register 11. Referring now to FIGURE 1, the sixteen least significant bits of the block word are the lower sixteen bits in the block word channel. The block bit in buffer register 6 is used to permis the block comparator 14, thereby allowing it to make the comparison.

Assuming now that the block word appears in buffer register 6, which block word is coincident with the block word pre-set in block word register 11. The block word comparator 14 in response to the coincidence gives a command (BWC) terminating the search mode and initiating the read mode. The block word comparator 14 thereby gives a BWC command to gate III for permising said gate and allowing the clock bit pulse which triggered gate I to trigger gate III and transfer the contents of buffer register 6 to memory register 7.

In the read mode, twenty bit words are transferred sequentially into buffer register 6 and eighteen of these bits are transferred into memory register 7 in response to the clock bit pulse triggering gate III. The block bit and the parity bit in buffer register 6 are excluded from the transfer to memory register 7.

Also, in the read mode, each block word that appears in buffer register 6 is transferred to the block word register 11, which transfer is controlled by gate II. In the search mode, the gate II is inhibited. However, at the initiation of the read mode, the BWC command from block word comparator 14 is applied to gate II through delay 33 for permising said gate thereby allowing the transfer of block words from buffer register 6 to block word register 11. The transfer of block words from buffer register 6 to block word register 11 will be discussed in further detail later in conjunction with FIGURE 3. As used herein, the term "permis" is employed as to mean the same as "enable." for example, the application of a one to a first input of an AND gate enables the AND gate to produce a change of state in its output in response to a control voltage or state thereafter applied to the second input of the AND gate.

When words are transferred from buffer register 6 to memory register 7, they are read-in to buffer memory 8. The address in buffer memory 8 for each word is selected by address 15 under control of index register A, 16. Each time the gate III is triggered for transferring a word from buffer register 6 to memory register 7, the controller 10 is triggered and gives a read-in command to gate IV, thereby triggering gate 4 and allowing index register A in conjunction with address 15 to select the proper address in buffer memory 8 for the word. Gate IV is thereby triggered each time a word is read-in to buffer memory 8 and in response thereto gives a decrement command to index register A. Since index register A is decremented each time that a word is read-in to buffer memory 8, it monitors the amount of words read-in to buffer memory 8 and in this sense acts as an address counter.

As mentioned before, the computer is asynchronous and each time a word is read-in to buffer memory 8, the computer has access to that word for its arithmetic operation. The arithmetic unit in the computer is illustrated by arithmetic unit 9 connected to memory register 7 which in turn is connected to the buffer memory 8. If the computer wants a word for its arithmetic operation, the word is transferred out of buffer memory 8 into memory register 7 and then to arithmetic unit 9. The address for the words read-out of buffer memory 8 is controlled by address 15 in conjunction with index register B 17. Assume that a word is read-in to buffer memory 8 and the program dictates that the word should be read-out of buffer memory 8. The controller 10 gives a read-out command to gate V which triggers gate V and allows address 15 in conjunction with index register B to read the word out of buffer memory 8 into memory register 7 whereat it is transferred to the arithmetic unit 9. Each time that a word is read-out of buffer memory 8, the controller 10 decrements index register B and in this sense the index register B monitors the amount of words read-out and acts as an address counter.

The function of index comparator 18 is to compare the contents of index registers A and B, thereby to determine the amount of words stored in the buffer memory 8. When a comparison of the contents of index registers A and B indicates that a predetermined maximum amount of words are stored in buffer memory 8, then index comparator 18 gives a full command. When the comparison indicates that a predetermined minimum amount of words are stored in buffer memory 8, the index comparator 18 gives an empty command. Furthermore, the index comparator 18 has an additional function, in that, when the contents of index registers A and B are equal, it gives an inhibit read-out command to the controller 10. The inhibit read-out command means that there are no available words in the buffer memory 8 for read-out.

It will be recalled that the contents of index registers A and B were initially set equal to each other and therefore, the index comparator 18 gave an inhibit read-out command to controller 10, whereby the computer does not have access to the buffer memory 8.

Assume now that the contents of index registers A and B are equal and that the index comparator 18 gives an inhibit read-out command to controller 10. The desired block indicated by the block word in buffer register 6 is ready for transfer into buffer memory 8 since the search mode is terminated. Although the word is ready for transfer, it must wait for the memory register and buffer memory to be available for that word. The controller 10 must give a buffer memory available command to gate III for permising said gate to allow the transfer of the block word from buffer register 6 to memory register 7. In general, the arithmetic operation in the computer takes about 2 microseconds. As a result, the word in buffer register 6 is delayed for this period of time since controller 10 does not permis gate III. However, in general, each word in buffer register 6 is there for about 32 microseconds and the buffer memory 8 will become available at some time within the 32 microsecond period. Therefore, the word in buffer register 6 may have to wait, but it will be transferred to memory register 7 when gate III is permised by the buffer memory available command from controller 10. No words are lost by their waiting for the buffer memory to become available. This will be discussed in more detail in conjunction with FIGURE 5.

Assume now that words are being transferred from buffer register 6 to memory register 7 and read-in to buffer memory 8 at a faster rate than words are read-out of buffer memory 8. The contents of index register A, therefore, decrease at a faster rate than the contents of index register B and the difference between the contents of said registers will indicate that a predetermined maximum amount of words has been stored in the buffer memory 8. In response to said predetermined maximum, the index comparator 18 gives a full command to the stop-reverse logic 21. However, it is desired to read a complete block of words into the buffer memory prior to terminating the read mode. Referring now to FIGURE 1, it can be seen that the block bit of a succeeding block indicates that the preceding block has been completed. Referring again to FIGURE 2, the read mode is terminated when a block bit (one pulse) is applied to the stop-reverse logic 21. The block bit pulse is applied to stop-reverse logic 21 from the block bit flip-flop in buffer register 6. The stop-reverse logic in response thereto gives a stop command to tape transport 2. Also, inhibit 36 is responsive to the full command from index comparator 18 in conjunction with the block bit from the succeeding block word to inhibit gate III, thereby preventing the transfer of said succeeding block word from buffer register 6 to memory register 7.

As recalled, the sixteen least significant bits of each block word appearing in buffer register 6 in the read mode, are transferred to block word register 11. Therefore, said succeeding block word is transferred to block word register 11. The inhibit command from inhibit 36 is applied to gate II through delay 34, thereby inhibiting gate II after the succeeding block word has been transferred to block word register 11.

Summarizing briefly, at the termination of the read mode, stop-reverse logic 21 gives a stop command to tape transport 2. Inhibit 36 gives an inhibit command to gate III and also gives a delayed inhibit command to gate II, whereby said succeeding block word is stored in block word register 11.

Assume now that the read mode has terminated and a stop command is given to tape transport 2. Referring now to FIGURE 1, assume further that the stop command was given when the head 1 was immediately adjacent and over the block word adjacent the start of record section (1 channel). Due to the overshoot of the reel tape, said block word will be to the left of head 1, a distance equal to the overshoot length.

In the recycle operation, the reel tape is reversed a predetermined length greater than the overshoot length, therefore said block word will be to the right of the head 1 at the termination of the recycle operation.

Since said block word terminated the read mode, its contents are stored in block word register 11. As a result, when the search mode is initiated, said block word being to the right of said head will appear in buffer register 6. The block word comparator 14 notes that said block word in buffer register 6 is coincident with the block word in block word register 11 and in response thereto gives its BWC command to initiate the read mode.

Referring to FIGURE 2, assume that words are being read-out of the buffer memory at a faster rate than words are read-in to the memory. The contents of index register B are thereby decreasing at a faster rate than the contents of index register A. When a comparison of the contents of index registers A and B indicates that a predetermined minimum amount of words is stored in buffer memory 8, the index comparator 18 gives an empty command to start logic 22. The start logic 22 gives a start command to tape transport 2 if the reel tape is stopped. For example, the reel tape may be moving when an empty command is given. In this case, a start command has no effect on the movement of the reel tape. If words are read-out until there are no more available words in the buffer memory 8, then the contents of registers A and B are equal and index comparator 18 gives an inhibit read-out command.

The transfer of words between buffer register 6, memory register 7 and block word register 11 in conjunction with the operation of gates II and III and the BWC command given by block word comparator 14 will be explained in further detail with reference to FIGURE 3.

Gates II and III are transformer gates and are described in detail in copending application Serial No. 166,488, entitled Computer Gating Circuit, filed on January 16, 1962 by Martin H. Graham, which copending application is assigned to the assignee of the present application and has now issued as Patent No. 3,235,847. Briefly, the transformer gates II and III effect, when energized by blocking oscillators 28 and 26 respectively, FIGURE 3, the transfer of digital information in buffer register 6 to memory register 7 and block word register 11.

The buffer register 6 is composed of twenty flip-flops. The memory register 7 is composed of eighteen flop-flops and the block word register 11 is composed of sixteen flip-flops. The outputs from eighteen flip-flops in buffer register 6 are directly connected, respectively, to the eighteen flip-flops in memory register 7. The eighteen flip-flops in buffer register 6 corresponding to the data bits are connected to memory register 7. The sixteen flip-flops in buffer register 6 corresponding to the sixteen least significant bits are directly connected, respectively, to the sixteen flip-flops in block word register 11. The manner in which one flip-flop in a first register is connected to a corresponding flip-flop in another register is illustrated in said copending application. A flip-flop suitable for use in registers 6, 7 and 11 is illustrated in FIGURE 2 of the copending application Serial No. 271,676, filed concurrently herewith, entitled Trigger Circuit, by Alan V. White, which application is assigned to the assignee of the present application.

Figure 3:
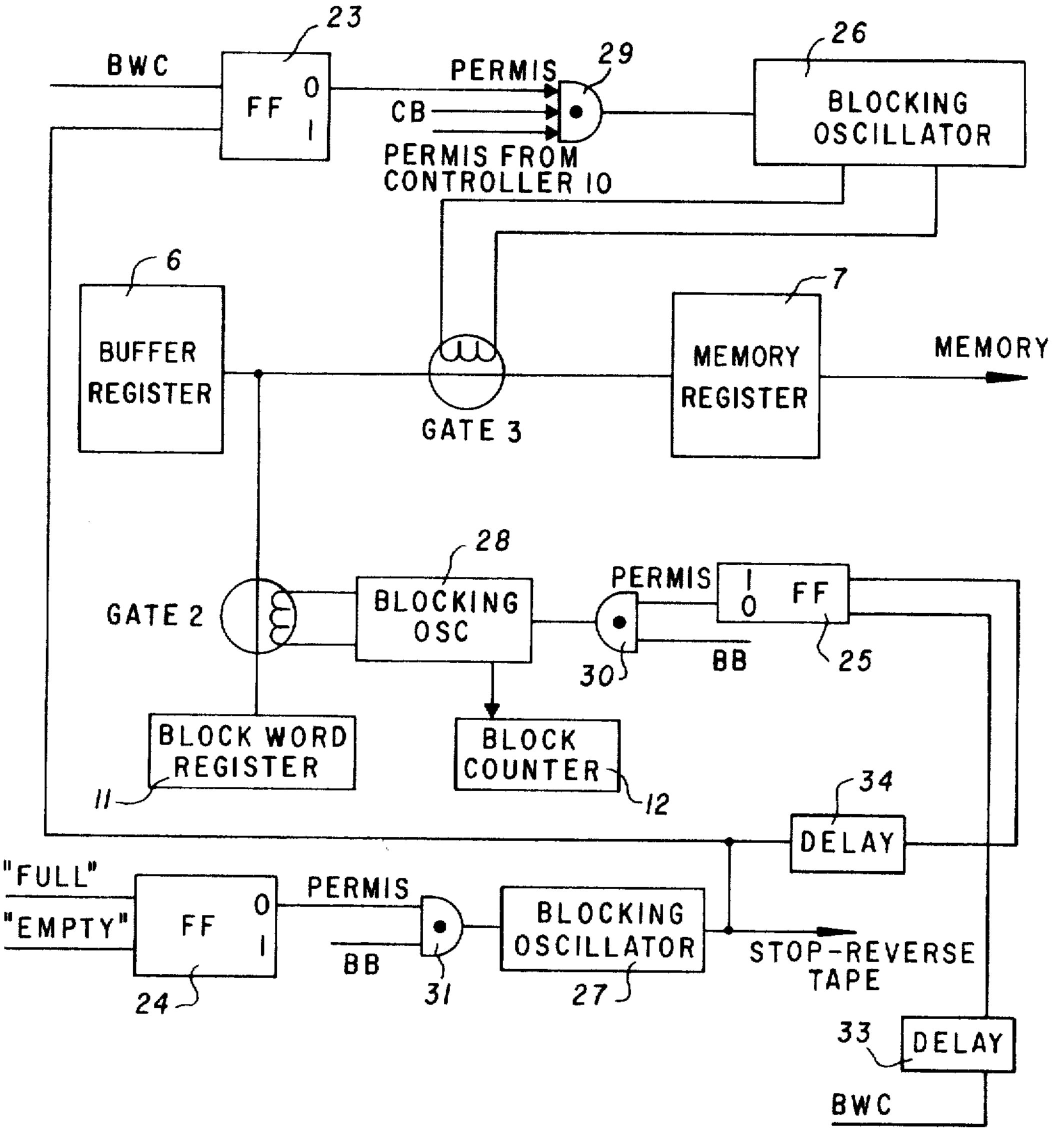
FIGURE 3 is a logic diagram illustrating the regulation of the flow of digital data between the buffer, memory and block word registers illustrated in FIGURE 2.

A suitable blocking oscillator for the blocking oscillators 26, 27 and 28 shown in FIGURE 3 (also the blocking oscillator 35 illustrated in FIGURE 2) is the pulse generator disclosed in the copending application Serial No. 271,678 filed concurrently herewith, entitled Pulse Generator, by Alan V. White, which application is assigned to the assignee of the present application and has now issued as Patent No. 3,204,126.

Assuming now that the search mode is initiated, a start command being given to the tape transport 2 by either the controller 10 or the start logic 22. Flip-flops 23, 24 and 25 are set in their zero states, that is, in the state illustrated in FIGURE 3 by the 0, 1 configuration. This means that And gates 29, 30 and 31 are not permised. Gates II and III are thereby inhibited since blocking oscillators 26 and 28 cannot be triggered.

When a block word appears in buffer register 6 which is coincident with the block word stored in the block word register 11, the block word comparator 14 terminates the search mode and initiates the read mode by giving a BWC command. The BWC command is applied to flip-flop 23 for setting it in its one state, thereby permising And gate 29. In order to trigger the And gate 29, permis signals must be present from flip-flop 23 and from the controller 10 indicating that the buffer memory is available. If these permis signals are present, the clock bit associated with the word to be transferred is applied to gate 29. The clock bit is a one pulse applied to gate 29 from gate I, illustrated in FIGURE 2. When all three signals, the two permis signals and the clock bit, are present at the input of gate 29, the blocking oscillator 26 is triggered, thereby energizing gate III and transferring the contents of buffer register 6 to memory register 7. Initially, the contents of buffer register 6 is a block word which is transferred to memory register 7. Since this block word is already present in block word register 11, it is not necessary to transfer between buffer register 6 and block word register 11. To inhibit the transfer of this block word, the BWC command is delayed by delay 33, thereby maintaining flip-flop 25 in its zero state for a predetermined time after the read mode is initiated. Since gate II is inhibited for a predetermined time after the And gate 29 has been permised by the BWC command, the block word in buffer register 6 is transferred to memory register 7 but not transferred to block word register 11. If the block word is in buffer register 6 for a period of about 32 micoseconds, the delay 33 should be greater than 32 microseconds to ensure that a data word is in buffer register 6 when And gate 30 is permised.

After the block word has been transferred out of buffer register 6 and a data word appears therein, the clock bit associated with said data word, in conjunction with the permis signal from controller 10, energizes And gate 29 for triggering blocking oscillator 6. Gate II is thereby triggered to transfer the data word from buffer register 6 to memory register 7.

Assume now that a complete block of words has been transferred from buffer register 6 to memory register 7 and the succeeding block word appears in buffer register 6. It is transferred to memory register 7 as usual, and it is also transferred to block word register 11 since And gate 30 is permised and the block bit associated with said succeeding block word energizes And gate 30 for triggering blocking oscillator 28 which in turn triggers gate II for transferring said succeeding block word to block word register 11. The block bit (BB) applied to the And gate 30 is obtained from the flip-flop in buffer register 6 corresponding to the block bit.

Each time that a block word is transferred to block word register 11, the block counter 12 is decremented by blocking oscillator 28. The block counter 12 monitors the number of block words transferred to block word register 11 in order to indicate the number of blocks of words transferred into buffer memory 8. The function of block counter 12 will be discussed in further detail later.

Assume now that the index comparator 18 gives a full command. The full command is applied to flip-flop 24 for setting the flip-flop into its one state in order to permis And gate 31. When the succeeding block word appears in buffer register 6 indicating that a complete block of words has been transferred into the buffer memory 8, the block bit associated with said succeeding block word energizes And gate 31 for triggering blocking oscillator 27. The output of blocking oscillator 27 is applied to flip-flop 23 to trigger it into its zero state, thereby inhibiting And gate 29. Said succeeding block word, therefore, is not transferred from buffer register 6 to memory register 7 since gate III is inhibited. However, said succeeding block word in buffer register 6 is transferred to block word register 11 since And gate 30 is permised when the block bit is applied thereto, thereby triggering blocking oscillator 28 which in turn triggers gate II for transfer. The block counter 12 is also decremented. The output of blocking oscillator 27 is applied to flip-flop 25 through delay 34 thereby setting said flip-flop in its zero state which inhibits And gate 30 after the occurrence of said block bit.

Assume now that the recycle operation has terminated, the amount of words stored in the buffer memory has reached a predetermined minimum and the index comparator 18 gives an empty command. The start logic 22, in response to the empty command, gives a start command to the tape transport 2 for initiating the search mode. The empty command from index comparator 18 is applied to flip-flop 24 for setting it in its zero state and inhibiting And gate 31.

Flip-flops 23 and 25 are in their zero states and gates II and III are thereby inhibited. Words are transferred into buffer register 6 until said succeeding block word appears in said register. As recalled, said succeeding block word is stored in block word register 11. At this time, the block word in buffer register 6 is coincident with the block word in block word register 11 and the block word comparator 14 gives a BWC command terminating the search mode and initiating the read mode. The BWC command is again applied to flip-flop 23 to set it in its one state, thereby permising And gate 29. The BWC command is also applied to flip-flop 25 through delay 33 to set flip-flop 25 in the one state, thereby permising And gate 30 after said succeeding block word has been cleared from buffer register 6.

The pulse generated by blocking oscillator 27, in response to a full command and a block bit, is applied to the tape transport 2 as the stop command. This is generally illustrated in FIGURE 2 as the stop-reverse logic 21.

Also, the pulse generated by blocking oscillator 27 in response to the full command and the block bit for setting flip-flop 23 in its zero state to inhibit And gate 29 are generally illustrated in FIGURE 2 as inhibit 36.

The gate I, generally illsutrated in FIGURE 2, may be a transformer gate as described in said copending application Ser. No. 166,488 (now Patent No. 3,235,847) for transferring the contents of register 4 to buffer register 6 in response to a clock bit at the output of delay 5. The clock bit at the output of delay 5 may be used to trigger a blocking oscillator for triggering the transformer gate in a manner similar to that illustrated in FIGURE 3. When the blocking oscillator is triggered by the clock bit from the output of delay 5, its pulse is applied to gate III and specifically in FIGURE 3 to And gate 29 at the CB input. This same pulse is applied to blocking oscillator 35 for triggering it in order to clear register 4.

The system operation is started by a start read tape command from controller 10 to tape transport 2 thereby starting the reel tape in said tape transport and initiating the search mode. In order to stop the system operation when all operations are completed, the end read tape 20 gives a stop command to tape transport 2. Referring to FIGURE 2, the end read tape 20 is connected to zero detector 13 and also the index comparator 18. The block counter 12 counts the number of blocks of words that have been transferred into buffer memory 8 since the block counter 12 is decremented each time a block word is transferred into block word register 11. The decrementing of block counter 12 is generally illustrated by the command given by gate II to block counter 12. The desired number of blocks to be read into the buffer memory is pre-set in block counter 12 and therefore when the block counter is decremented to zero, the system has completed its transfer operation. Zero detector 13 detects the zero condition of block counter 12 and generates a command in response thereto, which command is applied to end read tape 20. In response to the command from the zero detector, component 20 gives a stop command to tape transport 2. However, this stop command does not signify that the computer operation is completed since there may be available words stored in the buffer memory 8 which the computer desires to use. Thesefore, the inhibit read-out command from index comparator 18 is applied to end read tape 20. This command indicates that there are no available words stored in the buffer memory. The computer in response to the stop command generated by the component 20 and the inhibit read-out command from index comparator 18 knows that its operation is completed.

The stop command from end read tape 20 has been described with respect to the command given from zero detector 13. However, the end of record (EOR) code may be used to indicate that all the desired blocks of words have been transferred into the buffer, memory. In such case component 20 gives the stop command in response to the EOR command.

As previously stated, after a full command, it is desired to read a complete block of words in to buffer memory 8 prior to giving the stop command. Since each block is made up of thirty-two words, including the block word, the full command should be given when there is available storage space in the buffer memory for thirty-two more words. Therefore, when the difference between the contents of index registers A and B indicates that there are only thirty-two remaining available addresses in the buffer memory, the predetermined maximum amount of words is reached and in response thereto the index comparator gives a full command.

The aforementioned, predetermined minimum amount of words stored in the buffer memory at which the index comparator gives an empty command may be 128 words.

Further, by way of example, the memory 8 may be a 1024–18 bit word ferrite magnetic core storage matrix including means for reading data in and out of the memory. Half of the memory is used as the buffer memory and the other half as the main memory. The reel tape may be driven at the speed of 90 inches/second and in conjunction therewith, the time period of a block is 1 millisecond wherein the time between words is about 32 microseconds. The reel tape has the capability of stopping within 2 milliseconds from command and therefore, the reel tape is reversed for about 3.3 milliseconds in the recycle operation.

For the above examples, an appropriate delay for delay 5 is 16 microseconds.

Referring now to FIGURE 4 in which FIGURE 4*a* illustrates that portion of the index comparator 18 necessary to give a full command and in which FIGURE 4*b* illustrates that portion of the index comparator necessary to give an empty command, the inputs to the index comparator are obtained from index registers A and B. The index registers A and B are each composed of nine complementary flip-flops wherein each flip-flop has a "true" output and a complementary output. Said registers are circular wherein a decrement command, after the register has been decremented to zero, returns the register to its preset contents.

The "true" outputs for index register A are designated XA1, . . . XA9, beginning with the most significant bit. The complementary outputs of index register A are designated $\overline{XA1}$, . . . $\overline{XA9}$, also beginning with the most significant bit. Similarly, the "true" outputs of index register B are designated XB1, . . . XB9, beginning with the most significant bit. The complementary outputs of index register B are designated $\overline{XB1}$, . . . $\overline{XB9}$, also beginning with the most significant bit.

The comparator compares the five least significant bits in index registers A and B, that is, XA9, . . . XA5 is compared respectively with XB9, . . . XA5. If these bits are coincident with each other, a permis command is given. This permis command is a zero which is applied to an input of each And gate 36, 37, 38, 39, 41 and 42 in FIGURES 4*a* and 4*b* (not shown).

The index comparator in order to make the comparisons illustrated in FIGURES 4*a* and 4*b* must produce said permis command.

Referring now to FIGURE 4*a*, there are illustrated four And gates, 36, 37, 38 and 39 whose outputs are applied to Or gate 40. Each And gate, in order to produce a one output, requires five zeros at its inputs, the four illustrated in conjunction with said permis command. A one output from any of the And gates applied to the input or Or gate 40 produces a one output or a full command. Specifically, and referring to the inputs of And gate 36, $\overline{XA4}$ is Anded with XB4 and applied to one input, XA1 and XB1 are combined in an exclusive Or circuit and applied to another input, XA2 and XB2 are combined in an exclusive Or circuit and applied to another input, XA3 and XB3 are combined in an exclusive Or circuit and applied to another input. Referring to the inputs of And gate 37, $\overline{XA3}$ is Anded with XB3 and applied to one input, XA4 is Anded with $\overline{XB4}$ and applied to another input, XA1 and XB1 are combined in an exculsive Or circuit and applied to another input, XA2 and XB2 are combined in an exclusive Or circuit and applied to another input. Referring to the inputs of And gate 38, $\overline{XA3}$ is Anded with XB3 and applied to one input, XA4 is Anded with $\overline{XB4}$ and applied to another input, XA1 and XB1 are combined in an exclusive Or circuit and applied to another input, $\overline{XA2}$ is Anded with XB2 and applied to another input. Referring now to the inputs of And gate 39, XA3 is Anded with $\overline{XB3}$ and applied to one input, $\overline{XA4}$ is Anded with $\overline{XB4}$ and applied to another input, XA2 is Anded with $\overline{XB2}$ and applied to another input, XA1 is combined with XB1 in an exclusive Or circuit and the complementary output is applied to another input. All the outputs from the And gates are applied to Or gate 40 which produces a full command in response to a one appearing at the output of any of the And gates. The output of Or gate 40 indicates that the difference between the compared contents in index registers A and B is 32.

Referring now to FIGURE 4*b*, there are illustrated And gates 41 and 42 whose outputs are applied to Or gate 43. Whenever, a one appears at the output of And gate 41 or And gate 42, an empty command is produced by Or gate 43 which indicates that the difference between the compared contents in index registers A and B is 128. Specifically, referring to the inputs of And gate 41, XA4 and XB4 are combined in an exclusive Or circuit and applied to one input, XA2 is Anded with $\overline{XB2}$ and applied to another input, XA1 and XB1 are combined in an exclusive Or circuit and applied to another input, XA3 and XB3 are combined in an exclusive Or circuit and applied to another input. Referring now to the inputs of And gate 42, XA4 and XB4 are combined in an exclusive Or circuit and applied to one input, XA1 and XB1 are combined in an exclusive Or circuit and the complementary output is applied to another input, $\overline{XA2}$ is Anded with XB2 and applied to another input, XA3 and XB3 are combined in an exclusive Or circuit and applied to another input. Whenever five zeros (including the premis command) are present at the input of And gate 41 or the input of And gate 42, a one is produced at their corresponding outputs.

The index comparator 18 also compares the nine bits in index registers A and B and, in response ot coincidence therebetween, gives an inhibit read-out command.

As previously explained with reference ot FIGURE 2, the controller 10 gives a permis command to gate III (buffer memory available) so that the transfer of a word from buffer register 6 to memory register 7 is carried out when the buffe memory 8 is available, that is, when the arithmetic unit 9 has completed an arithmetic operation Also, when a permis command is given to gate III, the controller 10 inhibits the arithmetic unit so that it does not have access to the buffer memory when a word is being transferred into the buffer memory from buffer register 6

FIGURE 5 illustrates that portion of controller 10 which gives a permis command to gate III, inhibits the arithmetic unit, triggers gate IV and decrements index register A.

Referring now to FIGURE 5*a* wherein there is illustrated a logic diagram of the components for permising gate III, triggering gate IV and decrementing index register A, the flip-flops 44 and 46 are illustrated in their one state. The clock bit (CB) applied to flip-flop 44 from the gate I, illustrated in FIGURE 2, is effective to set flip-flop 44 in its one state thereby permising AND gate 45. An arithmetic command completed (ACC) signal is applied to AND gate 45 from flip-flop 51, illustrated in FIGURE 5*b*. When AND gate 45 is permised by flip-flop 44 and when the flip flop 51 is in its one state, the AND gate 45 is effective to trigger flip-flop 46 and set it in its one state thereby permising AND gate 47. A command (MI) is applied to AND gate 47 from the buffer memory 8 indicating that the buffer memory is idle. Therefore, when AND gate 47 is permised and an MI command is given, AND gate 47 is effective to trigger blocking oscillator 48. The output pulse from blocking oscillator 48 is applied to gate IV for triggering said gate and thereby causing the contents of index register A to be transferred to address register 15 in order to set the read-in address in buffer memory 8. Conjunctively therewith, the output pulse from blocking oscillator 48 is applied to AND gate 29, illustrated in FIGURE 3, for permising gate III. Also, said pulse is applied to delay 49, whose outut is applied to index register A and flip-flop 46. The delay 49 output decrements index register A and sets flip-flop 46 in its zero state. The inhibit output of flip-flop 46 is applied to AND gate 53, FIGURE 5*b*, for inhibiting the arithmetic operation.

Referring now to FIGURE 5b, wherein there is illustrated that portion of the controller for inhibiting the arithmetic operation, the AND gate 53 is inhibited when flip-flop 46 is in its one state, as previously described. When flip-flop 46 is in its zero state, AND gate 53 is not inhibited (inhibit) but is permised.

When an arithmetic operation is completed a command is given (AOC) which is necessary to start another arithmetic operation. The AOC command is applied to blocking oscillator 50 and a command for starting another arithmetic operation is obtained from the output of blocking oscillator 54. It can be seen that in order to start another arithmetic operation, the AND gate 53 must be permised. However, when a word is being read-in to the buffer memory, flip-flop 46 in its one state, the AND gate 53 is inhibited.

The blocking oscillator 50 is triggered in response to an AOC command thereby to set flip-flop 51 in its one state which in turn gives an ACC command to AND gate 45.

The delay 52 is connected between the output of flip-flop 51 and the input of AND gate 53. This delay is necessary to insure that flip-flop 46 is set in response to the AND gate 45 triggered thereby to inhibit AND gate 53 before it responds to the state of flip-flop 51.

An inhibit read-out command from index comparator 18 is also applied to AND gate 53. Therefore, in order for the AND gate 53 to trigger, flip-flop 51 must be in its one state, flip-flop 46 in its zero state and there must be a not-inhibit read-out command from index comparator 18. In this manner, an inhibit read-out command is effective to inhibit AND gate 53 and prevent the arithmetic unit from having access to the buffer memory.

The triggering of AND gate 53 is effective to trigger blocking oscillator 54 which in turn produces an output pulse for starting another arithmetic operation and for resetting flip-flop 51 to its zero state. When flip-flop 51 is reset to its zero state, AND gate 45 is inhibited.

In summary, in the read mode, words are sequentially transferred into the buffer memory 8. Each word awaits in buffer register 6 for the arithmetic operation to be completed, whereafter the word is transferred into the buffer memory 8 while the arithmetic unit is inhibited from having access to the buffer memory. The transfer of a word into the buffer memory 8 from the buffer register 6 is inhibited when the arithmetic unit is using the buffer memory and, conversely, the arithmetic unit is inhiibted when a word is being transferred into the memory from the buffer register.

Referring again to FIGURE 2, the tape transport 2 for clarity has been generally illustrated as having four inputs in order to start, stop or reverse the movement of the reel tape in response to commands from various components.

However, considering the Ampex TM–2 Tape Transport, the movement of the reel tape is controlled by two constant voltage lines applied to the electro-mechanical drive in the transport. One line is for forward movement and the other is for reverse movement. Each line, forward and reverse, includes a transistor switch for applying a voltage source to said drive. Hereinafter, the switch in the reverse line is referred to as the reverse switch and the switch in the forward line as the forward switch. The start read-tape command from controller 10 is applied to the forward switch thereby to close said switch and, in response thereto, a voltage source is applied to said drive for starting the tape movement. The stop command from stop-reverse logic 21 is effective to open the forward switch thereby to stop the forward movement of the tape. Said stop command, after a predetermined time delay, is then applied to the reverse switch thereby to close said switch for a predetermined period of time whereby the movement of the tape is reversed for a distance greater than the overshoot length.

The start command from start logic 22 and the stop command from end read-tape 20 are applied to the forward switch for respectively closing and opening said switch.

As an example of a control for the operation of said forward and reverse switches, the output of blocking oscillator 27, FIGURE 3, is applied to a flip-flop for setting it in its zero state. The output of said flip-flop is connected to the forward switch and therefore, said switch is opened in response to said flip-flop being set in its zero state. The output of said flip-flop is then applied through a delay means to the trigger input of a monostable multivibrator whose output is applied to the reverse switch. The monostable multivibrator, after a suitable delay, is triggered in response to the flip-flop being set in its zero state whereby the reverse switch is closed for a predetermined time (the time period of the multivibrator output pulse). Said suitable delay accounts for the overshoot time of the reel tape after the stop command.

The start and stop commands from start logic 22 and end read-tape 20 are applied to said flip-flop for setting it respectively in its one and zero state. Delay 33 has been herein disclosed as delaying the BWC command in order to delay the permis command applied to gate II at the initiation of the read mode. This prevented the block word in buffer register 6 at the initiation of the read mode, from being transferred to block word register 11. However, delay 33 may be eliminated and the BWC command applied directly to flip-flop 25. This means that said block word is transferred to block word register 11 at the initiation of the read mode. Since this transfer does not change the contents of the block word register, it is unimportant; however, the block counter 12 must be prevented from being decremented twice in response to the transfer of the same block word. Accordingly, an inhibit circuit may be connected between blocking oscillator 28 and block counter 12, which circuit inhibits the decrementing of the counter at the initiation of the read mode.

As pointed out before, handling the digital data stored on reel tape according to the invention permits the maximum storage of digital information on the reel tape. Also, in conjunction therewith, the reel tape reaches full speed prior to initiation of the read mode. This is important since the head output voltage depends upon the speed of the tape. If the reel tape is moving at or near full speed when the read mode is initiated, the head output voltage will be a suitable level.

It is to be understood that the above described embodiments are merely illustrative of the invention. Numerous other arrangements may be devised by those skilled in the art without departing from the spirit and scope of the invention as defined by the appended claims.

What is claimed is:

1. In a system for transferring digital data from a tape storage means to a memory where a tape storage means includes a tape having a plurality of blocks of digital words stored thereon with each block of words including a unique code for indicating the start of a block, the combination which comprises: a memory for storing digital words therein, means for transferring words from said tape to said memory including read-out means responsive to a word stored on said tape for reading said word out of said tape and read-in means for reading said word into said memory, means for moving said tape past read-out means, means for producing a full command in response to a predetermined number of words stored in said memory, means for producing a stop command in response to said full command and said unique code for stopping the movement of said tape and thereafter reversing the movement of said tape for a predetermined time to position said unique code behind said read-out means.

2. The system of claim 1, including means for producing an inhibit command for inhibiting said transferring means in response to said stop command.

3. The system of claim 2, including means for producing an empty command in response to a predetermined minimum amount of words stored in said memory.

4. The system of claim 3, including means for starting the movement of said tape past said read-out means in response to said empty command.

5. The system of claim 4, including means for permising said transferring means in response to said empty command and said unique code.

6. The system of claim 5, wherein said transferring means includes a buffer register connected between said read-out and read-in means, and said permising means includes a block word register for storing a word having said unique code therein, and a comparator for producing a permis command in response to the coincidence between corresponding bits in said buffer register and said block word register.

7. The system of claim 6, wherein said transferring means includes gate means connected between said buffer register and said read-in means for transferring words sequentially from said buffer register to said memory in response to a trigger applied to said gate means.

8. The system of claim 7, wherein said inhibit command and said permis command are applied to said gate means.

9. The system of claim 8, including another gate means connected between said buffer register and said block word register for transferring selected predetermined contents of said buffer register to said block word register in response to said permis command and the unique code.

10. The system of claim 9, wherein said selected predetermined contents is a block word having said unique code therein.

11. The system of claim 10, including delay means for applying said inhibit command to said other gate means after said block word has been transferred to said block word register.

12. The system of claim 11, wherein said coincidence between corresponding bits in said buffer register and said block word register occurs when a block word is stored in said buffer register, and including delay means for applying said permis command to said other gate means after said block word is transferred out of said buffer register.

13. In an asychronous digital computer having a buffer memory and a reel magnetic tape input with a tape having a plurality of blocks of words stored thereon, each block including a block word having a unique code therein for indicating the start of a block, a system for transferring digital data from said tape to said buffer memory, comprising: means for transferring words from said tape to said memory, which transferring means include read-out means responsive to a word stored on said tape for reading said word out of said tape and read-in means for reading said word into said memory, means for moving said tape past said read-out means, means for producing a full command in response to a predetermined number of words stored in said memory, and means for producing a stop command in response to said full command and said block word for stopping the movement of said tape and thereafter reversing the movement of said tape for a predetermined time to position said block word behind said read-out means.

14. The system of claim 6, wherein said unique code is applied to said permis means and said stop means from said buffer register.

15. The system of claim 7, including means for applying said trigger to said gate means in response to a clock bit associated with the word stored in said buffer register.

16. A system for asynchronously transferring digital words into and out of a memory comprising: a memory for storing digital words therein, read-in means operative to sequentially read each of a plurality of words into said memory, said read-in means including means for producing a command after each word is read into said memory, read-out means operative to read each stored word out of said memory, said read-out means including means for permising the operation of said read-out means in response to said command, whereby the read-out means has access to each word stored in the memory after it is read-in.

17. The system of claim 16, including means for inhibiting the operation of said read-in means in response to operation of said read-out means.

18. The system of claim 17, including means for inhibiting the operation of read-out means in response to the operation of said read-in means.

19. The system of claim 16 wherein said command indicates the termination of the operation of said read-in means and further including means for permising said read-in means in response to the termination of the operation of said read-out means.

20. In a system for transferring digital data from a tape storage means to a memory where a tape storage means includes a tape having a plurality of blocks of digital words stored thereon with each block of words including a unique code for indicating the start of a block, the combination which comprises: a memory for storing digital words therein, means for transferring words from said tape to said memory including read-out means responsive to a word stored on said tape for reading said word out of said tape and read-in means for reading said word into said memory, means for moving said tape past said read-out means, means for producing a full command in response to a predetermined number of words stored in said memory less than the capacity of said memory, means for producing a stop command in response to said full command and said unique code for stopping the movement of said tape and thereafter reversing the movement of said tape for a predetermined time to position said unique code behind said read-out means.

21. In a asynchronous digital computer having a buffer memory and a reel magnetic tape input with a tape having a plurality of blocks of words stored thereon, each block including a block word having a unique code therein for indicating the start of a block, a system for transferring digital data from said tape to said buffer memory, comprising: means for transferring words from said tape to said memory, which transferring means include read-out means responsive to a word stored on said tape for reading said word out of said tape and read-in means for reading said word into said memory, means for moving said tape past said read-out means, means for producing a full command in response to a predetermined number of words stored in said memory less than the capacity of said memory, and means for producing a stop command in response to said full command and said block word for stopping the movement of said tape and thereafter reversing the movement of said tape for a predetermined time to position said block word behind said read-out means.

References Cited by the Examiner

UNITED STATES PATENTS 2,904,777 9/1959 Cox et al. ---------- 340—174

ROBERT C. BAILEY, *Primary Examiner.*

R. B. ZACHE, *Assistant Examiner.*